US010201064B1

(12) United States Patent
Soto et al.

(10) Patent No.: US 10,201,064 B1
(45) Date of Patent: Feb. 5, 2019

(54) POWER SUPPLY FOR A TWO-WIRE SMART DIMMER AND LIGHTING LOADS THEREOF

(71) Applicant: Kleverness Incorporated, Walnut, CA (US)

(72) Inventors: Gerardo Gomez Soto, Tequisistlan Tezoyuca (MX); Leobardo Stephen Lincoln Strange Zenteno, Gustavo A. Madero (MX); Dan Nurko Elliot, Naucalpan de Juarez (MX); Jorge Ivan Ramirez Lira, Miguel Hidalgo (MX)

(73) Assignee: KLEVERNESS INCORPORATED, Walnut, CA (US)

( * ) Notice: Subject to any disclaimer, the term of this patent is extended or adjusted under 35 U.S.C. 154(b) by 0 days.

(21) Appl. No.: 16/002,187

(22) Filed: Jun. 7, 2018

Related U.S. Application Data

(63) Continuation-in-part of application No. 15/665,894, filed on Aug. 1, 2017, now Pat. No. 10,021,765.

(51) Int. Cl.
*H05B 33/08* (2006.01)
*H05B 39/04* (2006.01)
*H05B 37/02* (2006.01)

(52) U.S. Cl.
CPC ....... *H05B 39/048* (2013.01); *H05B 33/0809* (2013.01); *H05B 33/0848* (2013.01); *H05B 37/02* (2013.01)

(58) Field of Classification Search
CPC ............... H05B 37/02; H05B 37/0227; H05B 37/0245; H05B 37/0272; H05B 39/048; H05B 33/08; H05B 33/0809; H05B 33/0848; H04L 67/12; G05B 13/0265; G08C 17/02; G08C 2201/20; G08C 2201/30; G08C 2201/31
USPC ................ 315/151, 291, 297, 307, 308, 312
See application file for complete search history.

(56) References Cited

U.S. PATENT DOCUMENTS

| | | | |
|---|---|---|---|
| 5,038,081 A | 8/1991 | Maiale, Jr. et al. |
| 7,446,671 B2 | 11/2008 | Giannopoulos et al. |
| 7,687,940 B2 | 3/2010 | Mosebrook et al. |
| 8,492,984 B2 | 7/2013 | Deurenberg et al. |
| 8,664,881 B2 | 3/2014 | Newman, Jr. et al. |
| 8,892,913 B2 | 11/2014 | Newman, Jr. et al. |
| 8,922,133 B2 | 12/2014 | Hausman, Jr. et al. |
| 9,084,324 B2 | 7/2015 | Salvestrini |
| 9,250,669 B2 | 2/2016 | Blakeley et al. |

(Continued)

FOREIGN PATENT DOCUMENTS

| | | |
|---|---|---|
| AU | 7472981 A | 3/1982 |
| CN | 201188670 Y | 1/2009 |

(Continued)

*Primary Examiner* — Jimmy Vu
(74) *Attorney, Agent, or Firm* — Shumaker, Loop & Kendrick, LLP (57) ABSTRACT

The present invention refers to an Electrical Power System (EPS) or Power Supply for a smart dimmer for controlling the intensity of illumination of a dimmable lighting load within an electrical installation that has two or three wires in the switch box (two-wire and three-wire switches). The Power Supply is able to detect and control different types of lighting technologies, such as incandescent or LED bulbs. The Power Supply also provides a voltage signal indicating the current consumed by the lighting loads.

22 Claims, 6 Drawing Sheets

(56) References Cited

U.S. PATENT DOCUMENTS

| | | | |
|---|---|---|---|
| 9,343,997 B2 | 5/2016 | Newman, Jr. et al. | |
| 9,343,998 B2 | 5/2016 | Newman, Jr. et al. | |
| 9,354,643 B2 | 5/2016 | Harel | |
| 9,401,588 B2 | 7/2016 | Zulim et al. | |
| 9,418,809 B2 | 8/2016 | Hausman, Jr. et al. | |
| 9,572,215 B2 | 2/2017 | Datta | |
| 9,595,880 B2 | 3/2017 | Knode et al. | |
| 9,853,561 B2 | 12/2017 | Newman, Jr. et al. | |
| 9,941,811 B2 | 4/2018 | Newman, Jr. et al. | |
| 9,986,624 B2 | 5/2018 | Vangeel et al. | |
| 10,021,765 B1 | 7/2018 | Elliot et al. | |
| 2010/0101924 A1 | 4/2010 | Wu et al. | |
| 2013/0154495 A1* | 6/2013 | He | H02M 1/44 315/210 |
| 2013/0175931 A1* | 7/2013 | Sadwick | H05B 37/02 315/158 |
| 2013/0300545 A1 | 11/2013 | Rao et al. | |
| 2016/0124453 A1 | 5/2016 | Blakeley et al. | |

FOREIGN PATENT DOCUMENTS

| | | |
|---|---|---|
| CN | 201589976 U | 9/2010 |
| CN | 102063102 A | 5/2011 |
| CN | 202551079 U | 11/2012 |
| CN | 102882752 A | 1/2013 |
| CN | 203250198 A | 10/2013 |
| CN | 103475554 A | 12/2013 |
| CN | 203339430 U | 12/2013 |
| CN | 103596294 A | 2/2014 |
| CN | 104330974 A | 2/2015 |
| CN | 204156886 U | 2/2015 |
| CN | 204190090 U | 3/2015 |
| CN | 204217165 U | 3/2015 |
| CN | 204241946 U | 4/2015 |
| CN | 204719434 U | 10/2015 |
| CN | 204719435 U | 10/2015 |
| CN | 204719436 U | 10/2015 |
| CN | 204719514 U | 10/2015 |
| CN | 204719515 U | 10/2015 |
| CN | 204832937 U | 12/2015 |
| CN | 105338699 A | 2/2016 |
| CN | 105632162 A | 6/2016 |
| CN | 205388682 U | 7/2016 |
| CN | 205726601 U | 11/2016 |
| CN | 106325240 A | 1/2017 |
| CN | 205921804 U | 2/2017 |
| IN | 20130263414 A | 6/2016 |
| JP | 2012174488 A | 9/2012 |
| KR | 2013110763 A1 | 10/2013 |
| WO | 2009099082 A1 | 8/2009 |
| WO | 2016014957 A1 | 1/2016 |

* cited by examiner

POWER SUPPLY FOR A TWO-WIRE SMART DIMMER AND LIGHTING LOADS THEREOF

CROSS REFERENCE TO RELATED APPLICATIONS

This application is a Continuation-In-Part claiming priority from U.S. patent application Ser. No. 15/665,894, filed Aug. 1, 2017, entitled INTELLIGENT SWITCH DEVICE AND CENTRAL CONTROL SYSTEM THEREOF, the entire disclosures of which are hereby incorporated by reference.

TECHNICAL FIELD OF THE INVENTION

The present invention relates to the technical field of power delivery to lighting devices, more particularly, to a Power Supply or Electric Power System for a two-wire or three-wire smart or intelligent dimmer and the lighting load connected to the dimmer.

BACKGROUND OF THE INVENTION

In recent years, there has been a development in technology that has been applied in the automation of houses, buildings, etc., which has been termed as home automation or domotics.

A key part of home automation is the automation of lighting systems, with devices such as intelligent switches and dimmers, also known as smart switches or dimmers. With the quick development of these technologies, people have begun to adopt smart switches and dimmers for their homes. Smart dimmers allow a user to switch on, turn off, dim a lighting device, control it remotely or measure power consumption.

Smart dimmers usually need three wires to function, that is, a hot or phase wire from the alternating-current (AC) source is connected to one terminal of the smart dimmer, a second wire is connected to another terminal of the smart dimmer and the lighting device to be controlled, and a neutral wire from the AC source is connected to a third terminal of the smart dimmer, which closes the circuit inside the smart dimmer, allowing current flow for the operation of the electronics of the smart dimmer.

Usually, the electrical wiring of homes has only the first two wires in a switch box or wallbox, with the neutral wire absent from the switch box, since common (non-smart) switches or dimmers are connected in series between the AC source and the lighting device. This yields the problem of having to rewire the entire home in order to bring a neutral wire from the AC source to the switch box.

Some smart dimmers measure the power consumption by means of their power supply. Said power consumption is calculated for an entire circuit (one way, line, or gang), i.e. for all the electric loads combined that are connected to the circuit. Therefore, a user cannot measure the power consumption of each individual load. The power consumed by each individual load is useful to know if a lighting device is consuming more power than usual or to know when to replace a lighting device.

A method for power Measurement in a Two-Wire Load Control Device is disclosed in U.S. Pat. No. 9,250,669 B2. More specifically, it is disclosed a load control device for two or three wire switches, that includes a microcontroller and integrated circuits. Wherein the controller detects via a zero-cross detection circuit a zero crossing event. The controller is configured to issue a control signal to a drive circuit to operate the controllably conductive device at a firing time during a half-cycle. The controllably conductive device is implemented as a TRIAC, the TRIAC will become non-conductive when the load current through the TRIAC drops below a rated holding current of the TRIAC at the end of the half-cycle, however, said device relies on an energy storage device (a capacitor), therefore the power is not supplied continuously. Furthermore, the load control device describes a forward phase control and is silent on how to perform reverse phase control, which is more complex and usually requires more electronic components than forward phase control.

A Load Control Device for High-Efficiency Loads in U.S. patent application Ser. Nos. 12/952,920 and 15/131,444 and their families discloses a dimmer switch, for low-power lighting loads, that provides a pure phase-cut waveform. The dimmer switch has implemented a TRIAC, but may alternatively be implemented as one or more silicon-controlled rectifiers (SCRs), or any suitable thyristor. The TRIAC comprises two main terminals that are coupled in series electrical connection between the hot terminal H and the dimmed hot terminal DH, such that the TRIAC is adapted to be coupled in series electrical connection between the AC power source and a LED driver for conducting the load current to the LED driver. The load control device has a mechanical switch that controls the powering of the whole device, and when the mechanical switch is off, the system is unpowered, therefore requiring the physical input from a user to reactivate the load control device. Therefore, the dimmer cannot allow the remote operation of the same if the switch is off, which limits its smart capabilities.

Another dimmer switch for use with lighting circuits having three-way switches is described in U.S. Pat. No. 7,687,940 B2. However, the smart switch can be installed only in three or four-way switches systems, that includes a dimmer switch with a bidirectional semiconductor switch, such as a TRIAC. A controller is coupled to the gate of the TRIAC through a gate drive circuit and controls the conduction time of the TRIAC each half-cycle. A power supply is coupled across the TRIAC and generates a DC voltage VCC to power the controller. A zero-crossing detector determines the zero-crossing points of the AC voltage source and provides this information to the controller. An airgap switch disconnects the dimmer switch and the lighting load from the AC voltage source and therefore de-energizes the controller. A memory is required for storing the present state of the dimmer switch, wherein the lighting control system has implemented a sensing circuit that has a current sense transformer that only operates above a minimum operating frequency, for example, 100 kHz, such that current only flows in the secondary winding when the current waveform through the primary winding has a frequency above the minimum operating frequency, wherein the system includes only two controllably conductive devices or bidirectional semiconductor switches, such as a TRIACs. However, the power supply of the system sometimes is unable to supply power to the controller through the duration of a toggle or switching of the three-way switch, and the controller of the system will reset. Therefore, the reliability of the dimmer is belittled, since a voltage variation will cause a malfunctioning if the power supply does not draw enough energy to keep itself functioning. Additionally, if the state of the power supply or dimmer is not stored in the memory, the power supply will not operate correctly.

A smart dimming solution for LED light bulb and other non-linear power AC loads in U.S. Pat. No. 9,354,643 B2 discloses a dimmer that employs a TRIAC and two IGBTs.

The dimmer is capable of switching between at least three distinct modes of operation. In this first mode the current flows solely through TRIAC in both the positive and negative cycles of VAC, while IGBTs remain deactivated. A second mode the current flows solely through one of the IGBTs, depending on the cycle of VAC, while TRIAC remains deactivated. In the third or intermediate mode, TRIAC, both IGBTs are selectively activated and can selectively operate in a forward or reverse phase control embodiment. In this third mode, the majority of current flows to the load through activated TRIAC, but TRIAC can be deactivated before a zero volt crossing by VAC during either the positive or negative cycle. In this mode, TRIAC is deactivated when one of the IGBTs is activated for a very short period of time. An activated IGBT, in essence electrically shorts the TRIAC, which in turn starves TRIAC of the minimal holding current needed to maintain conduction. However, the use of three semiconductor devices complicates the operation and manufacturing, diminishes the reliability due a to a higher number of components for controlling only one lighting load and passively consumes more energy while dimming.

Therefore, it is desired a two-wire smart dimmer power supply that works continuously, does not need a physical input from the user to be activated and deactivated and is able to perform forward and reverse phase control dimming and adapt according to the necessities of the lighting load.

SUMMARY OF THE INVENTION

The present invention discloses a Power Supply or Electric Power System for an intelligent or smart dimmer device able to control the intensity of a dimmable lighting load, such as incandescent or LED bulbs, configured to be installed in a conventional home electrical installation for two-wire switch boxes, without the need to modify the electrical wiring installation. The smart dimmer is also able to work with a three-wire configuration (phase/hot, neutral and the wire from the load). If the three wires are available in the switch box, the user is able to select whether to use two or three wires.

The Power Supply supplies enough power for a variety of peripherals and components of the smart dimmer, e.g. a wireless communication module, a user interface with LEDs, and a microprocessor or microcontroller.

When the lighting loads are off, and there are only two wires in the switch box, the Power Supply closes the circuit by letting a small amount of current to pass from the AC mains through the lighting load, thus obtaining energy for powering the smart dimmer components. The current passing through the lighting load should be small enough to not let the lighting load turn on. If the lighting load is a low power lighting load (e.g. an LED), an adapter may be used in order to avoid the flicker of the same.

The Power Supply is able to measure the power consumed by the loads and determining what kind of lighting load is connected to the same (LED or incandescent bulbs) via a microcontroller or microprocessor by outputting a voltage signal proportional to the current consumed flowing through the lighting loads.

Furthermore, depending on the type of the lighting load (resistive or capacitive loads), the dimming mode should vary accordingly. Resistive loads like incandescent light bulbs, are best dimmed with a leading edge pattern or forward phase control; while capacitive loads like the drivers of LED lights are best dimmed with a trailing edge pattern or reverse phase control. The power supply is able to operate in the two dimming modes: trailing edge and leading edge and has a zero crossing detection module for the AC voltage of the electric installation for synchronizing the dimming with the phase of the AC mains voltage.

Additionally, the Power Supply is compatible with American and European switch boxes and electrical standards, i.e. 110-120 Volts and 60 Hz or 220-240 Volts and 50 Hz.

BRIEF DESCRIPTION OF THE DRAWINGS

The invention may be better understood by referring to the following figures.

DETAILED DESCRIPTION OF THE INVENTION

First Embodiment of the Invention

Figure 1:
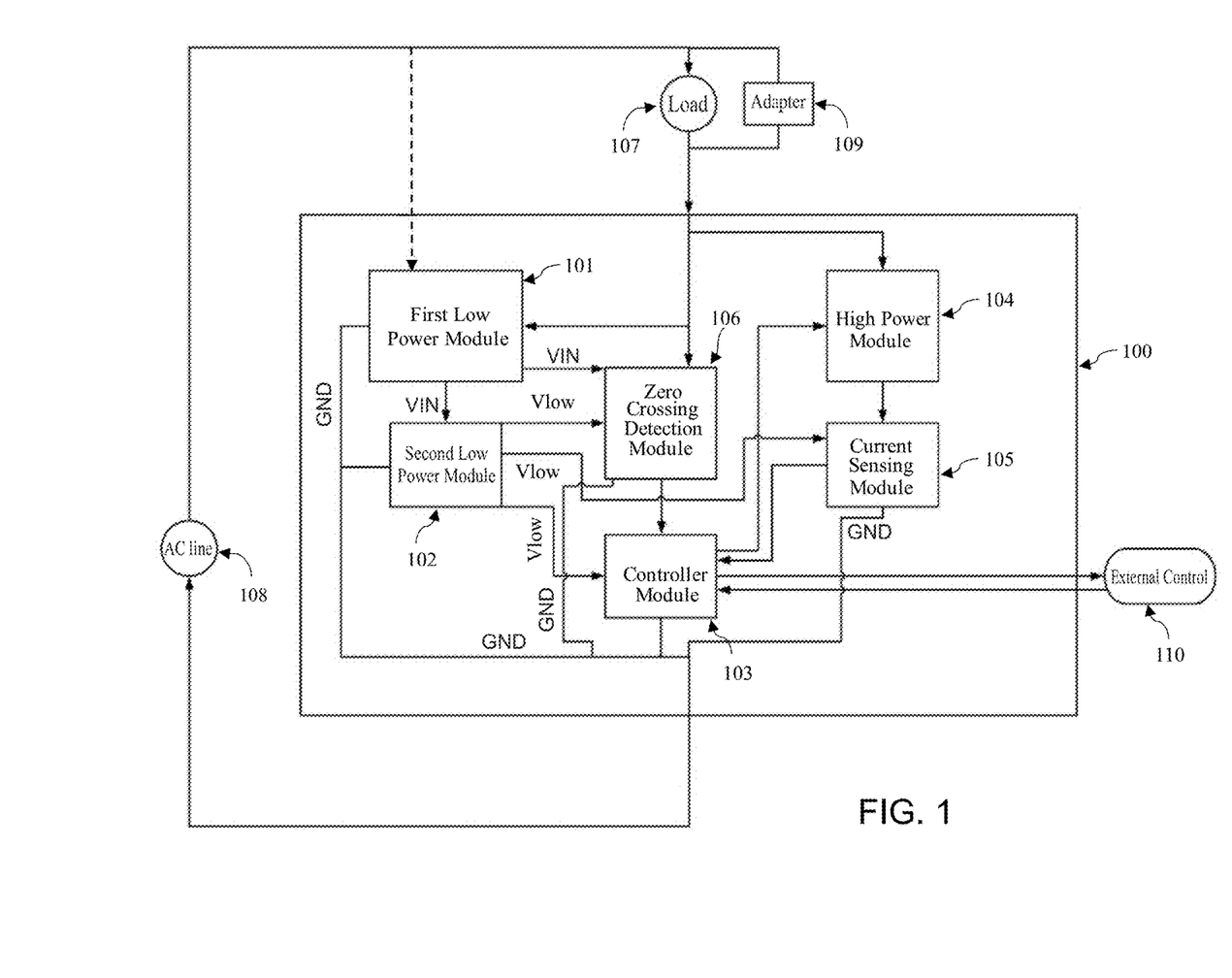
FIG. 1 is a block diagram depicting the functioning a first embodiment of the Power Supply.

FIG. 1, depicts the overview of a first embodiment of the Power Supply 100, also called Electrical Power System, EPS, which has six main submodules: A first low power module 101, a second low power module 102, a controller module 103, a high power module 104, a current sensing module 105, and a zero crossing detection module 106, a lighting load 107 and a low power lighting load adapter 109. The Power Supply 100 is connected to the lighting load 107, and to the AC mains 108. An overall description of the system is as follows.

A first mode of operation is implemented when there are three wires available in the switch box: hot/phase/line (the three terms will be used indistinctly throughout this description) wire, neutral wire and the lighting load wire, not taking into account the ground or earth wire. The neutral and phase wires of the AC mains 108 are connected and supplying power directly to the first low power module 101. The neutral wire is depicted in FIG. 1 as a dashed line. In this mode of operation, the power supply 100 operates in a conventional way, obtaining power from the AC mains directly 108 for the electronic components of the smart dimmer to operate correctly.

Usually there are only two wires available in the switch box for a single dimmer (not taking into account the earth or ground wire). When this is the case, the second mode of operation is employed. The two wires that are usually located in a switch box are the phase wire and the wire from the lighting load. It is to be noted that, in some electrical installations, the phase wire may be absent from the switch box and replaced with the neutral wire. If this is the case, the power supply 100 is able to operate with the neutral wire and the wire from the lighting load. For illustrative purposes, the wire coming from the AC mains will be treated as the phase wire. The Power Supply 100 has a selector switch for selecting at the time of installation between the first or the second modes of operation, depending on the availability of two or three wires in the switch box.

In this mode of operation, power is needed all the time to feed the electronic circuits that control the operation of the smart switch and other peripheral circuits, such as a communications module, or a user interface, regardless of the state (on or off) of the lighting load 107. To accomplish this, the wire from the lighting load 107 is connected to the first low power module 101 and the high power module 104. When the lighting load 107 is in its off state, the high power module 104 will act as an open circuit and current will flow only through the first low power module 101. The first low power module 101 is connected directly to the phase wire and indirectly to the neutral wire via the load 107, thus closing the circuit by letting a small current pass through the lighting load 107 and the Power Supply 100 itself, in such way that the small current should not allow to illuminate the lighting load 107.

If the lighting load 107 is a low power lighting load like a Light Emitting Diode (LED), the current flowing through the lighting load 107 and the Power Supply 100 may be enough to make the lighting load flicker, or it may be even that the impedance of the lighting load is low enough for it to illuminate. A low power lighting load adapter 109 may be connected in parallel to the lighting load to prevent these unwanted effects. The low power lighting load adapter 109 provides an additional path for the current to flow due to its lower impedance, therefore it can limit the current that flows through the lighting load 107. The low power lighting load adapter 109 may comprise resistive, capacitive, inductive elements, or a combination thereof.

When the lighting load 107 is in its off state, a relatively small current flows through the low power lighting load adapter 109, the lighting load 107 and the Power Supply 100 and powers the first low power module 101, which receives the power from the AC mains 108 and outputs a constant first level DC voltage (Vin). In a preferred embodiment, the first low power module 101 is implemented by means of a flyback converter that includes a High Precision CC/CV (Constant Current/Constant Voltage) Primary-Side PWM Power Switch.

The voltage Vin powers a second low power module 102, which steps down the voltage to a second level DC voltage (Vlow) that is used to power the controller, current sensing and zero crossing detection modules 103, 105 and 106. The zero crossing detection module 106 detects the zero crossings of the AC mains 108 voltage to send said detections to the controller module 103 to control the dimming of the lighting load 107. In a preferred embodiment, the second low power module 102 is implemented by means of a buck converter.

Figure 2:
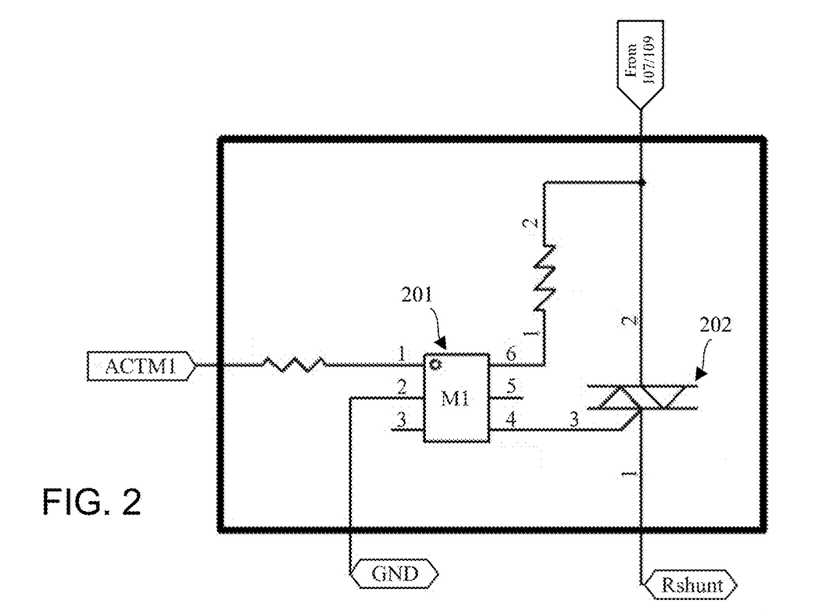
FIG. 2 is an electrical diagram of a preferred embodiment of the high power module.

Referring to FIG. 2, the controller module 103 sends an activation signal ACTM1 that is used to trigger a circuit that switches on or off the lighting load 107, in order to control the dimming of the same. To protect the low power electronic components of the controller module 103, the circuit that switches on or off the lighting load has an isolation stage that electrically isolates the controller module 103 from the AC mains 108 power. In a preferred embodiment the isolation is implemented by means of an opto-isolator or opto-cupler 201 which receives the activation signal ACTM1 from the controller module 103 and lets current to flow into the gate of a bidirectional semiconductor or controllably conductive device to activate or deactivate the conduction of the same. In a preferred embodiment the bidirectional semiconductor or controllably conductive device is implemented by a TRIAC 202. The TRIAC 202 is connected in series to the lighting load 107. In response to the activation signal, the terminals of the TRIAC 202 act as a short circuit, allowing the AC mains 108 current to flow through the lighting load 107 and low power lighting load adapter 109 (if applicable).

If the lighting load 107 illuminates at a high intensity (e.g. at a 100% duty cycle), the voltage drop on the same is almost of the same magnitude as the AC mains voltage 108. This causes a voltage divider effect that causes a short circuit effect that leaves almost no voltage in the first low power module 101, and therefore, leaving the Power Supply 100 without enough voltage to function. In order to overcome this issue, the lighting load 107 is not allowed to operate beyond a maximum duty cycle, which in a preferred embodiment said duty cycle is 85%. If the Power Supply 100 is operating in the maximum duty cycle, the remaining 15% of the cycle the lighting load 107 is in off state. When the lighting load 107 is in its off state, there is a voltage between the terminals of the power supply 100, which powers the first low power module 101. During said 15% of cycle the first low power module 101 draws enough current to supply power to the smart switch in order to keep it functioning until the lighting load is in its off state again in a subsequent cycle.

The dimming is controlled by means of the controller module 103. The controller module 103 is responsible for receiving a dimming percentage value from an external control 110. Said dimming percentage value is inputted by a user on a local or remote user interface, such as a touch panel or an app. The activation signal ACTM1 is timed so as to be in sync with the phase of AC mains 108, otherwise the lighting load 107 will flicker. The timing of ACTM1 is calculated by detecting the zero crossings of the AC voltage of the AC mains 108.

The controller module 103 is also responsible for reading a voltage signal generated by the current sensing module 105, that indicates the current consumed by the lighting load 107. Said voltage signal may be communicated to another external control 110 for the user to monitor the power consumption. In a preferred embodiment, the communication between the external control 110 and the controller module 103 may be performed in SPI protocol, and the communication between the external controller module 110 and another smart switch may be performed via an external wireless communications module (not shown), using the RF spectrum and a proprietary communications protocol.

Figure 3:
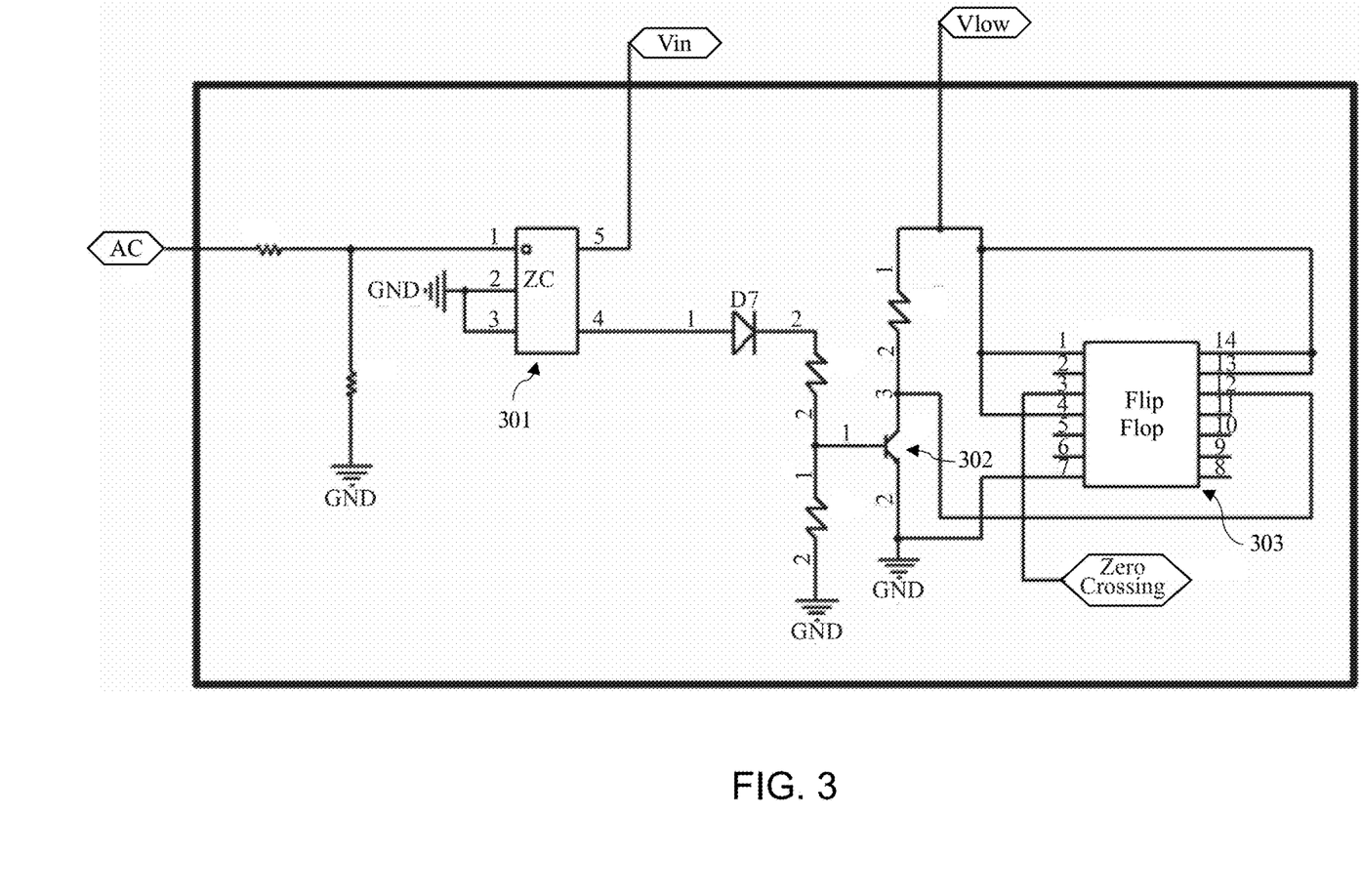
FIG. 3 is an electrical diagram of a first embodiment of the zero crossing detection module.

The power supply 100 is able to work as either a trailing edge dimmer or a leading edge dimmer. To control the dimming of the lighting load 107, careful timing is needed to send the activation signal ACTM1 to trigger precisely the TRIAC 202 into conduction, according to the lighting duty cycle requested by the user. Some lighting loads modify the frequency of the current passing through them, which may cause the controller module 103 to detect zero crossings that are not in sync with the phase of the AC mains 108, thus affecting the timing of the activation signal ACTM1. To overcome this, the Zero Crossing signal from the zero crossing detection module 106 is used to detect the zero crossing of the voltage from the AC line. The zero crossing detection module 106 employs a comparator 301 in a non-inverting configuration, as shown on a preferred embodiment in FIG. 3. The inputs of the comparator 301 are ground (GND) and an AC voltage whose input is the terminal labeled AC, which comes from the input of the first low power module 101, and passes through a voltage divider in order to lower the AC voltage to a level compatible with the comparator 301. The comparator 301 is polarized by Vin from the first low power module 101 and ground. When the voltage of the AC mains 108 is positive the comparator 301 will saturate positively, and when the voltage is negative, the comparator 301 will saturate negatively outputting ground level. The output of the comparator 301 is connected to a latching circuit, that in a preferred embodiment is implemented by means of a transistor 302 and flip flop circuit 303. The transistor 302 receives the output from the comparator 301 and when the output of the comparator is at ground level, the transistor sends a HIGH signal to the clock of the flip flop 303. When the output of the comparator is at Vin Voltage Level, the transistor sends a LOW signal to the clock of flip flop 303. The toggle of the comparator output acts then as a clock input, in order to produce a clean square wave at the line frequency (50 or 60 Hz) that toggles when the AC wave crosses zero volts, regardless of variations of the duty cycle of the dimmer and AC line voltage. The clean square signal is labeled as Zero Crossing and is inputted to the controller module 103, in order to control the timing of the dimming.

When dimming an incandescent bulb, the power supply 100 preferably works in a leading edge or forward phase control. In this mode, the controller module 103 receives the Zero Crossing signal and waits for a period of time, according to the dimming percentage value from the external control 110, before sending the ACTM1 signal to the high power module 104. ACTM1 signal is then continuously sent until the AC wave crosses zero and the cycle repeats.

When dimming an LED bulb, the power supply 100 generally works in a trailing edge or reverse phase control. In this mode, the controller module 103 receives the Zero Crossing signal to send a signal ACTM1 to the high power module 104 to turn on the lighting load 107. After waiting for a period of time calculated on the basis of the dimming percentage value, the sending of the ACTM1 signal is stopped. The drivers of most LED light bulbs usually consume a small amount of current which is not in sync with the phase of the voltage of the AC mains 108. The current consumption of the LED light bulb is such that the current crosses zero several times during a 60 Hz cycle, usually reaching frequencies in the order of kHz. Therefore, when the sending of ACTM1 signal is stopped, shortly thereafter the current between the terminals of the TRIAC 202 will reach zero and will stop conducting due to the nature of the LED drivers. ACTM1 signal is not sent until the next zero crossing detection of the AC mains 108.

Figure 4:
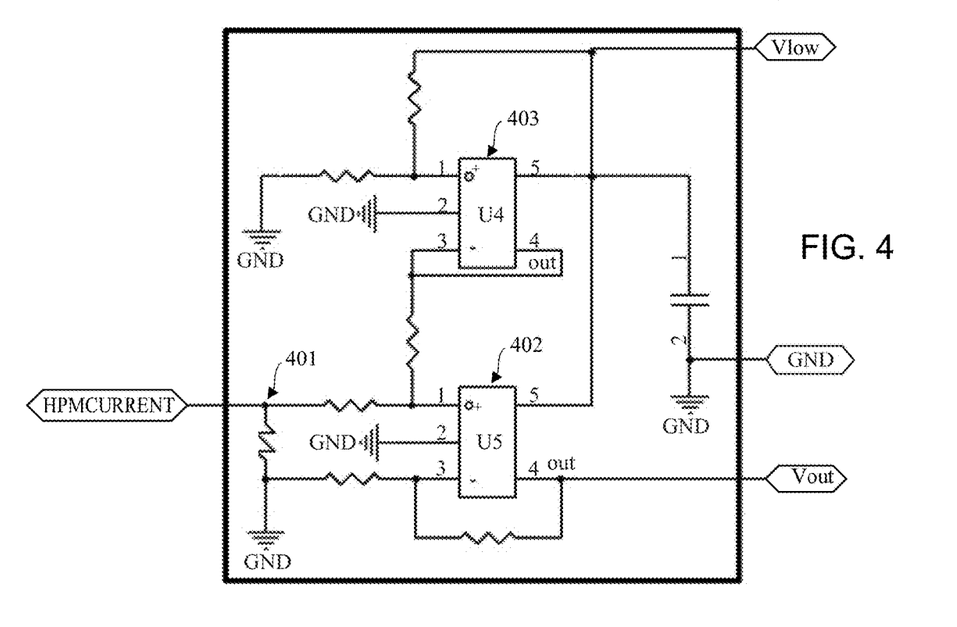
FIG. 4 is an electrical diagram of a first embodiment of the current sensing module.

The current that flows out of the TRIAC 202 is labeled HPMCURRENT and is fed to the current sensing module 105. Referring to FIG. 4, the current sensing module 105 converts the HPMCURRENT current into a voltage signal (Vout) to be fed to the ADC of the controller module 103. The current sensing module 105 is arranged in such a way that the HPMCURRENT current passes through a shunt resistor 401 which allows a small current to pass through an amplifying stage, which in a preferred embodiment is performed by means of the OPAMP 402 which amplifies the signal of the HPMCURRENT current, and additionally the OPAMP 403 adds an offset voltage to the signal of the HPMCURRENT current, in order to make Vout compatible with the voltage level of the Analog-to-Digital Converter (ADC) of the controller module 103. Vout is used to measure the power consumption, the type of technology of the lighting load connected (incandescent or LED bulb) to the power supply 100 and to determine the best mode of dimming a lighting load, i.e. leading or trailing edge.

Second Embodiment of the Invention

Figure 5:
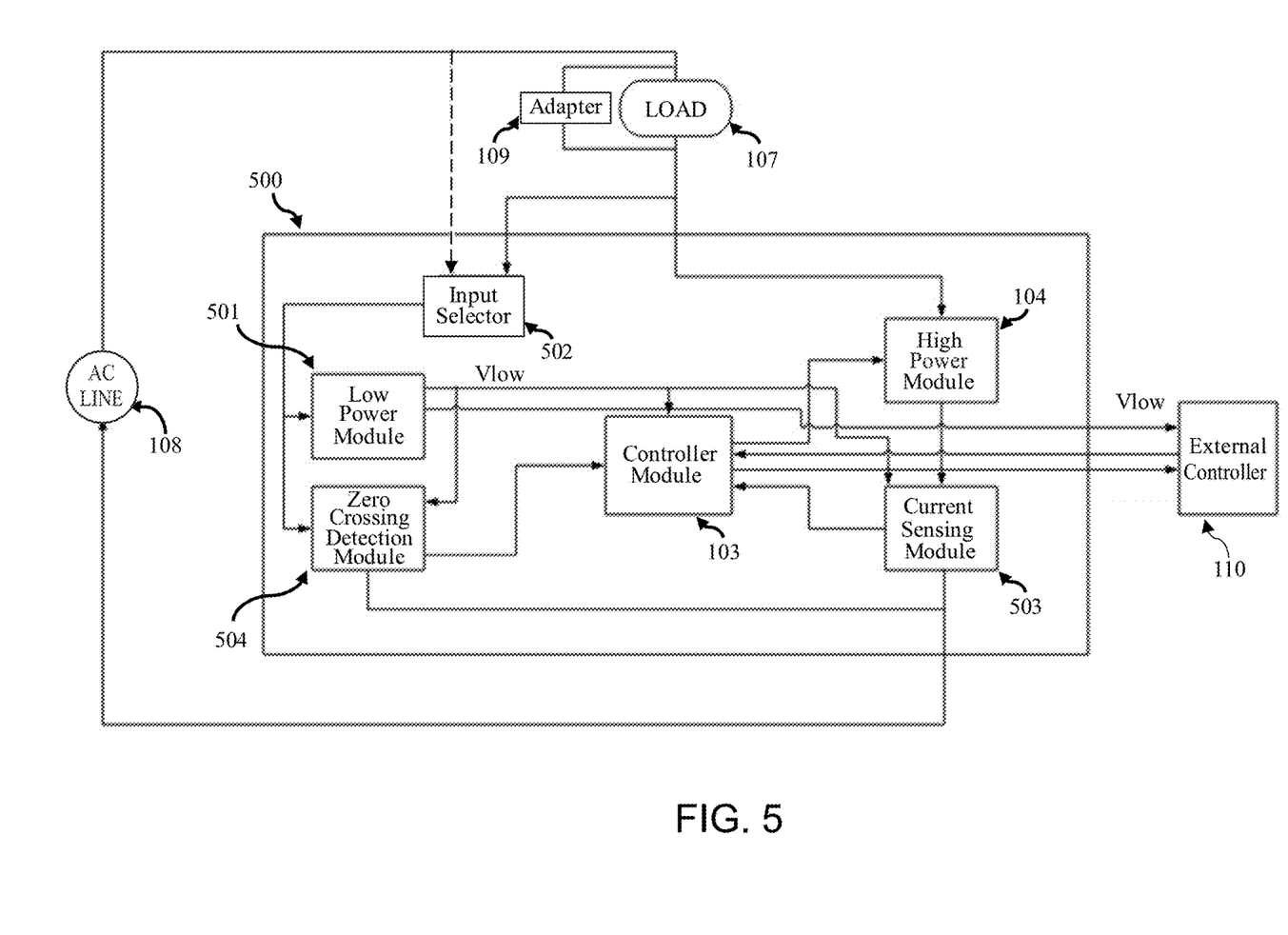
FIG. 5 is a block diagram depicting the functioning a second embodiment of the Power Supply.

A simplified block diagram 500 of a second embodiment of the invention is depicted in FIG. 5. The second embodiment of the invention consists of a low power module 501 that converts directly from AC to the second level DC voltage (Vlow), an input selector 502 for automatically selecting between the three-wire or the two-wire configurations, a controller module 103 as the one described in the first embodiment of the invention, a high power module 104 as the one described in the first embodiment of the invention and depicted in FIG. 2, a current sensing module 503, a zero crossing detection module 504, a lighting load 107 and a low power lighting load adapter 109 as described in the first embodiment of the invention. The Power Supply 500 is connected to the lighting load 107, and to the AC mains 108. An overall description of the system is as follows.

The first mode of operation is implemented when there are three wires available in the switch box: hot/phase/line wire, neutral wire and the lighting load wire, not taking into account the ground or earth wire. The wire from the lighting load 107, is connected to the input selector 502 and the high power module 104. The neutral wire is depicted in FIG. 5 as a dashed line. The wire from the lighting load 107 is connected to the input selector 502 and the high power module 104. When the lighting load 107 is in its off state, current will flow only through the input selector 502, since the high power module 104 will act as an open circuit. The input selector 502 leads to the low power module 501 that accesses the neutral wire needed to close the circuit via the lighting load 107, by letting a small current pass through the lighting load 107 and the Power Supply 500 itself.

If the lighting load 107 is a low power lighting load like a Light Emitting Diode (LED), the current flowing through the lighting load 107 and the Power Supply 500 may be enough to make the lighting load flicker, or it may be even that the impedance of the lighting load is low enough for it to illuminate. A single low power lighting load adapter 109 may be connected in parallel to the lighting load 107 to prevent these unwanted effects.

When the lighting load 107 is in its off state, a relatively small current flowing through the Power Supply 500 powers the low power module 501, which receives the power from the AC mains 108 and outputs the constant second level DC voltage, Vlow. In this embodiment of the invention, all of the electronic components are galvanically isolated from the AC current from AC mains 108. The isolation in the low power module 501 is implemented by a flyback converter with a high voltage flyback switcher circuit and an isolated transformer, which outputs Vlow with its ground isolated from the AC mains 108.

Referring to FIG. 2 again, the activation signal ACTM1 is used to trigger the circuit that switches on or off the lighting load 107 in the high power module 104. In this module, the galvanic isolation is performed by means of opto-isolator 201 which receives the activation signal and lets current to flow into the gate of TRIAC 202 that is connected to the lighting load 107. In response to the activation signal, the terminals of the TRIAC act as a short circuit, allowing the AC mains 108 current to flow through the lighting load 107. The activation signal ACTM1 is provided by the controller module 103. The dimming of the lighting load 107 is performed in the same way as described in the first embodiment of the invention.

When the lighting load 107 is switched on, the voltage drop on the same is almost of the same magnitude as the AC mains voltage 108. This causes a voltage divider effect that leaves almost no voltage in the low power module 501, causing a short circuit effect, thus leaving the Power Source 500 with not enough voltage to operate. To overcome this issue, the controller module 103 receives a zero crossing signal of the voltage AC wave generated by the zero crossing detection module 504 and based on this signal, the microcontroller waits for a period of time after the zero crossing detection to send the activation signal ACTM1. In this period of time when the lighting load is off, the low power module 501 receives enough power to operate until the next zero crossing. Consequently, the low power module 501 is always powered, regardless of the state of the lighting load 107.

Figure 6:
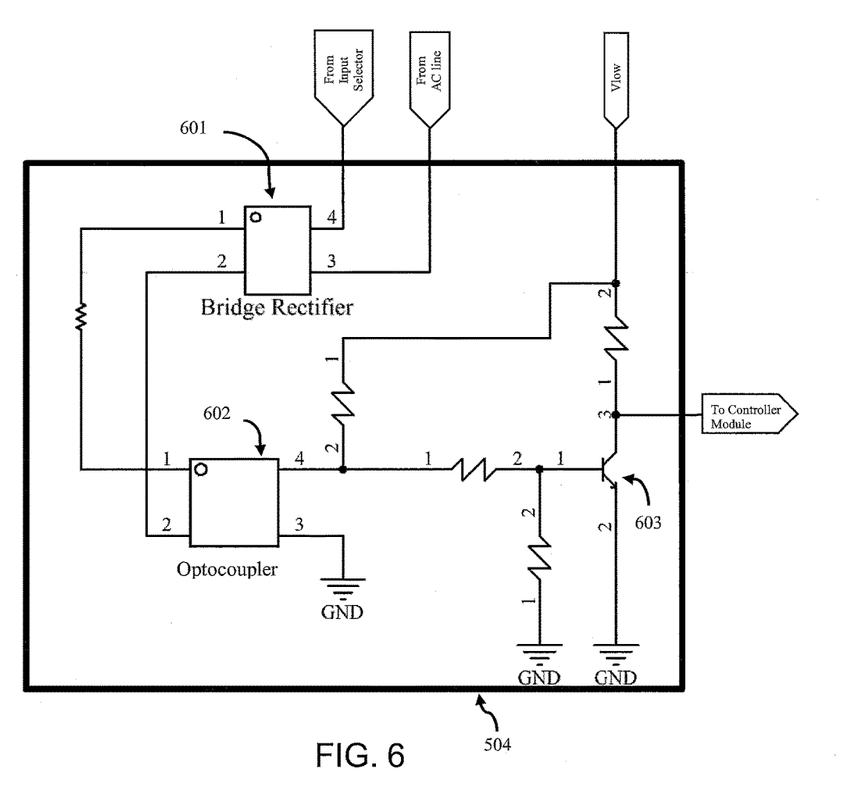
FIG. 6 is an electrical diagram of a second embodiment of the zero crossing detection module.

The zero crossing detection module 504 is depicted in FIG. 6 and employs a bridge rectifier 601 connected to the AC voltage from the input selector 502 and the phase wire from the AC mains 108. The rectified AC signal is outputted to an opto-isolator or optocoupler 602 that galvanically isolates the zero crossing module from the AC mains 108. The output of the opto-isolator 602 is received by the base of the transistor 603. The transistor 603 then outputs a HIGH signal (Zero Crossing Signal) to the controller module 103 when the current in its base is zero, i.e., when the AC wave crosses zero, in order to control the timing of the turning on or off of the lighting load 107.

The HPMCURRENT that goes through the TRIAC 202 exits the high power module 104 and enters the current sensing module 503 for measuring the power consumption of the lighting load 107.

Figure 7:
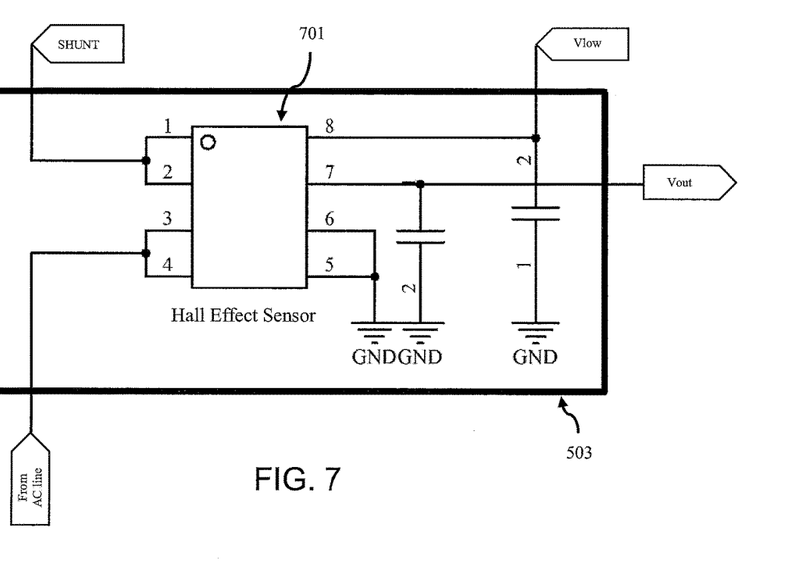
FIG. 7 is an electrical diagram of a second embodiment of the current sensing module.

A preferred embodiment of the current sensing module 503 is depicted in FIG. 7, which converts the current HPMCURRENT into a voltage signal (Vout) to be fed to the controller module 103. In this embodiment, the current sensing module 503 is galvanically isolated from the AC mains 108 with a device such as a hall effect sensor 701. The hall effect sensor 701 measures the current 203 and outputs Vout which is sent to the controller module 103 in order to calculate the power consumption of the lighting load 107. Vout is also used to determine the type of technology connected to the smart switch, i.e., incandescent or LED bulb.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A power supply for a two-wire or three-wire smart dimmer, to control the intensity of illumination of a lighting load powered by main electricity, the power supply comprises:
    a first low power module;
    a second low power module;
    a high power module;
    a current sensing module;
    a zero crossing detecting module;
    a controller module; and
    a low power lighting load adapter;

wherein:
    if the dimmer has a two-wire configuration and the lighting load is a low power lighting load, the low power lighting load adapter is connected in parallel to the lighting load and AC power flows from the low power lighting load and the low power lighting load adapter to the first low power module when the low power lighting load is in an off state;
    if the dimmer has a two-wire configuration and the lighting load is not a low power lighting load, the low power lighting load adapter is not connected to the lighting load and the AC power flows from the lighting load to the first low power module when the low power lighting load is in an off state;
    if the dimmer has a three-wire configuration, the AC power flows from a neutral and a phase wire to the first low power module;
    the high power module turns on the lighting load for less than a half cycle of the main electricity, when an activation signal is received from the controller module, and a shunt current flows out of the high power module when the lighting load is in an on state that is fed to the first low power module;
    the first low power module converts the AC power from the main electricity into a first level DC voltage;
    the controller module performs forward phase or reverse phase control via the activation signal based on a dimming value inputted from a user and a zero crossing signal;
    the zero crossing module outputs the zero crossing signal to the controller module when a wave of the AC main voltage crosses zero volts, in order to synchronize the timing and delay of the activation signal with the phase of the main electricity;
    the first level DC voltage is inputted to the second low power module, wherein the first level DC voltage is converted to a second level DC voltage that powers components that allow for the functioning of the smart dimmer; and
    the current sensing module is powered by the second level DC voltage and converts the shunt current from the lighting load into a current-voltage signal to be outputted to the controller module.

2. The power supply of claim 1, wherein a power consumption of the lighting load is calculated based on the current-voltage signal.

3. The power supply of claim 1, wherein a type of the lighting load is calculated based on the current-voltage signal.

4. The power supply of claim 1, wherein a functioning anomaly of the lighting load is calculated based on the current-voltage signal.

5. The power supply of claim 1, wherein the turning on of the lighting load for less than a half cycle of the main electricity is performed by a bidirectional semiconductor device.

6. The power supply of claim 1, wherein the two-wire configuration consists of a phase wire and a wire from the lighting load.

7. The power supply of claim 1, wherein the three-wire configuration consists of a phase wire, a neutral wire and a wire from the lighting load.

8. The power supply of claim 1, wherein the first low power module comprises a selector switch to select between the two-wire or three-wire configurations.

9. The power supply of claim 1, wherein the two-wire or three-wire configuration is automatically selected based on the current-voltage signal.

10. The power supply of claim 1, wherein the lighting load is a resistive lighting load or an LED lighting load.

11. The power supply of claim 1, wherein the low power lighting load adapter comprises one of a resistive adapter, a capacitive adapter, an inductive adapter or a combination thereof.

12. A power supply for a two-wire or three-wire smart dimmer, to control the intensity of illumination of a lighting load powered by main electricity, the power supply comprises:
- a low power module;
- a high power module;
- a current sensing module;
- a zero crossing detecting module;
- a controller module; and
- a low power lighting load adapter;

wherein:
- if the dimmer has a two-wire configuration and the lighting load is a low power lighting load, the low power lighting load adapter is connected in parallel to the lighting load and AC power from the main electricity flows from the low power lighting load and the low power lighting load adapter to the first low power module when the low power lighting load is in an off state;
- if the dimmer has a two-wire configuration and the lighting load is not a low power lighting load, the low power lighting load adapter is not connected to the lighting load and the AC power flows from the lighting load to the first low power module when the low power lighting load is in an off state;
- if the dimmer has a three-wire configuration, the AC power flows from a neutral and a phase wire of the main electricity to the first low power module;
- the high power module turns on the lighting load for less than a half cycle of the main electricity, when an activation signal is received from the controller module, and a load current flows out of the high power module when the lighting load is in an on state;
- the first low power module converts the AC power from the main electricity into a low level DC voltage that powers the controller module, the current sensing module and the zero crossing detection module;
- the controller module performs forward phase or reverse phase control via the activation signal based on a dimming value inputted from a user and a zero crossing signal;
- the zero crossing module outputs the zero crossing signal to the controller module when a wave of the AC main voltage crosses zero volts, in order to synchronize the timing and delay of the activation signal with the phase of the main electricity;
- the current sensing module converts the load current from the high power module into a current-voltage signal to be outputted to the controller module; and
- the low power module, the high power module, the current sensing module, the zero crossing detecting module and the controller module are galvanically isolated from the main electricity.

13. The power supply of claim 12, wherein a power consumption of the lighting load is calculated based on the current-voltage signal.

14. The power supply of claim 12, wherein a type of the lighting load is calculated based on the current-voltage signal.

15. The power supply of claim 12, wherein a functioning anomaly of the lighting load is calculated based on the current-voltage signal.

16. The power supply of claim 12, wherein the turning on of the lighting load for less than a half cycle of the main electricity is performed by a bidirectional semiconductor device.

17. The power supply of claim 12, wherein the two-wire configuration consists of a phase wire and a wire from the lighting load.

18. The power supply of claim 12, wherein the three-wire configuration consists of a phase wire, a neutral wire and a wire from the lighting load.

19. The power supply of claim 17, wherein an input selector automatically selects between the two-wire or three-wire configurations.

20. The power supply of claim 19, wherein the two-wire or three-wire configuration is automatically selected based on the current-voltage signal.

21. The power supply of claim 12, wherein the lighting load is a resistive lighting load or an LED lighting load.

22. The power supply of claim 12, wherein the low power lighting load adapter comprises one of a resistive adapter, a capacitive adapter, an inductive adapter or a combination thereof.

* * * * *